Feb. 20, 1962 S. DE VRIES 3,021,656
DEVICE FOR USE IN FILLING A CONTAINER WITH FRUIT
Filed Dec. 22, 1959 2 Sheets-Sheet 1

Feb. 20, 1962          S. DE VRIES          3,021,656
DEVICE FOR USE IN FILLING A CONTAINER WITH FRUIT
Filed Dec. 22, 1959          2 Sheets-Sheet 2

3,021,656
DEVICE FOR USE IN FILLING A CONTAINER WITH FRUIT
Siebren de Vries, Leeuwarden, Netherlands, assignor to Hermes Landbouwmachinefabriek S. de Vries N.V., Leeuwarden, Netherlands, a limited liability company of the Netherlands
Filed Dec. 22, 1959, Ser. No. 861,371
Claims priority, application Netherlands Dec. 24, 1958
6 Claims. (Cl. 53—248)

This invention relates to a device for filling a container with vegetable products such as fruit, bulbs, tubers, or similar material.

In handling fruit, for example, in sorting or packing, extreme care must be exercised to avoid damage of the fruit.

If an apple or a pear, for example, falls from a small height it may develop a rotten-ripe spot thereon.

It is an object of this invention to provide a device for filling a container with fruit without substantially damaging the fruit.

Another object of the invention is to provide a device for filling a container with fruit in which the fruit is limited to fall a distance which is less than the diameter of a single piece.

A further object of the invention is to provide a device for filling a container with fruit in which large quantities of fruit may be handled such as fruit being fed by a sorting machine.

Still another object of the invention is to provide a device for filling a container with fruit in which the device is automatically operated by the fruit itself whereby one operator will be able to survey a plurality of devices.

Other objects and advantages and the manner in which they are obtained will appear in the detailed description of illustrative embodiments of the invention, reference being made to the accompanying drawings, in which.

Figures 1, 2, 3, 4:
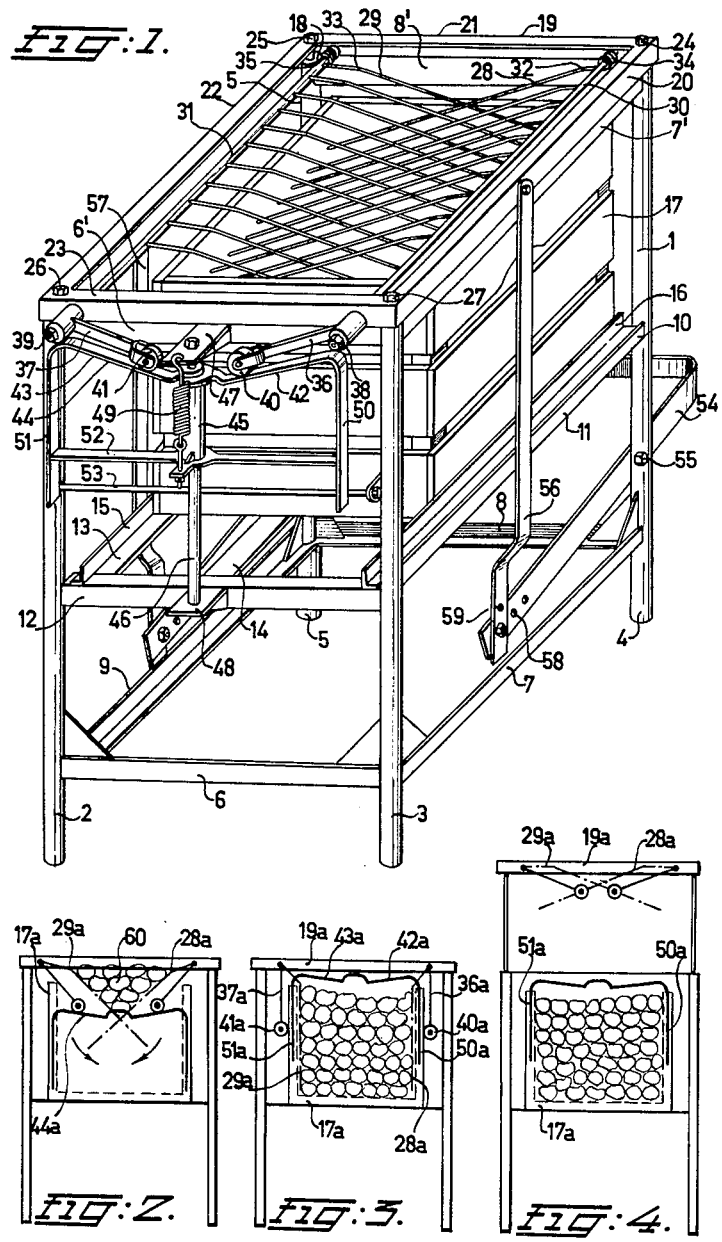
FIGURE 1 is a perspective view of a device according to the invention.
FIGURES 2, 3 and 4 show in outline a front view of the device according to FIGURE 1, in which figures the various positions successively occupied by the movable parts of the device in filling a container are represented.

In FIGURE 1 a frame is indicated by 1. This frame comprises four tubeshaped legs 2, 3, 4, and 5, which are connected by connecting rods, of which those situated at the lower side are indicated by the numerals 6, 7, 8 and 9 and the rods at the upper side and which can be seen in the figure are indicated by 6', 7', 8'.

In the frame 1 at half the height of the legs 2, 3, 4 and 5 there is provided a support 10, the rods 11, 12 and the strips 13 and 14 being a part thereof. On the support 10 the guides 15 and 16 are provided between which a fruit case 17 is placed by inserting the latter at the back side of the frame 1 and pushing it over support 10.

The frame 1 supports a supporting frame 19 which is provided with guide pins fitting into the tubular legs 2, 3, 4 and 5. The guide pin for the leg 5 is indicated at 18. The supporting frame 19 consists of the girders 20, 21, 22 and 23, to which the guide pins are secured by nuts 24, 25, 26 and 27.

In the supporting frame 19 parallel to the girders 20 and 22 are two axles 30 and 31. These axles are provided with tines 28 and 29 and are rotatably supported in bearings. The tines 28 on the axle 30 are staggered with respect to the tines 29 of the axle 31, while the tines 28 and 29 furthermore are bent at 32, 33 respectively so as to form a gully when they are turned towards each other. This position is shown in FIGURE 1.

The tines 28 and 29 are retained in the latter position by readjustment springs 34 and 35, mounted on the axles 30 and 31 respectively. Cranks 36 and 37 are secured on the extremities of the axles 30 and 31 which protrude from the girder 23 of the supporting frame by means of the nuts 38 and 39. At their free ends the cranks 36 and 37 are provided with rolls 40 and 41 which rest on guide rails 42 and 43 of a pressure absorbing device 44. The guide rails are connected to sliding piece 45 which is slidable along a guide bar 46. The guide bar 46 is secured at one end to a bracket 47 at the connecting rod 6' and on the other end is secured to a bracket 48 on the rod 12. The sliding piece 45 is connected to the bracket 47 by means of an adjustable draw spring 49.

The guide rails 42 and 43 are provided at their extremities with vertical guide pieces 50 and 51, which are supported by a strip 52 secured to the sliding piece 45. A distortion of the pressure receiving device 44 about the vertical axle constituted by the guide rod 46 is resisted by a rod 53 secured to the legs 2 and 3, against which the guide pieces 50 and 51 bear.

The supporting frame 19 is movable in a vertical direction by means of a foot operated lever 54 which is supported on the legs 4 and 5 by means of bolts of which the one for the leg 4 in FIGURE 1 is indicated with 55. The lever 54 is connected to the girders 20 and 22 of the supporting frame 19 by the connecting rods 56 and 57.

The lever 54 and the rods 56 and 57 are provided with adjusting holes 58, 59 respectively in order to adjust the magnitude of vertical displacement of the supporting frame 19.

The operation of the device is as follows. After a fruit case 17 is placed on support 10 in the way described hereinbefore, the fruit to be packed into the cases are fed on the tines 28, 29 which is facilitated in that these tines form a gully.

Owing to the weight of the fruits the tines 28 and 29 turn towards the bottom of the case 17. During this turning the pressure absorbing device controls the rotation of the axles 30 and 31 and makes them rotate gradually and in the same degree as the cranks 36 and 37 press the guide rails 42 and 43 downwardly against the pressure of the spring 49. Consequently the delivered fruits are lowered progressively in the case. The tines 28 and 29 are preferably of such a length that in their vertical position they abut the bottom of the case 17, so that the fed fruit is retained as long as possible by the tines 28 and 29.

In FIGURES 2, 3 and 4 the various positions successively occupied by the movable part of the device are shown in outline. In these figures parts corresponding with parts of FIGURE 1 are indicated by the same references as in FIGURE 1. The letter *a* is added however.

FIGURE 2 shows an intermediate position. Herein the tines 28*a* and 29*a* because of the weight of fruit 60 are turned from their initial position in the direction of the bottom of the case while the pressure absorbing device 44*a* is pressed downwardly by the cranks 36*a* and 37*a*. In FIGURE 3 the tines 28*a* and 29*a* have reached a vertical position and rest against the upright walls of the case 17*a*. The cranks 36*a* and 37*a* are also in the upright position and rest with their rolls 40*a* and 41*a* against the vertical guide pieces 50*a* and 51*a* of the pressure absorbing device which after the rolls 40*a* and 41*a* have left the guide rails 42*a* and 43*a* has simultaneously moved upwardly. In this position the pronged elements are released of the pressure of the spring 49 so that in lifting the frame 19 the pronged elements cannot damage the fruit. FIGURE 4 shows the final position of the device in which position the filled case 17*a* can be removed. In this position the supporting frame 19a is raised and the tines 28a and 29a have resumed the position in which they are turned one toward another which position could be reached under the influence of the readjustment springs 34 and 35 (FIGURE 1) after the rolls 40a and 41a had left the vertical guide pieces 50a and 51a.

After the filled case is removed from the frame and an empty case has been placed on this frame, the supporting frame 19a is again displaced downwardly thereby permitting another case to be filled in the way described hereinbefore.

Figure 5:
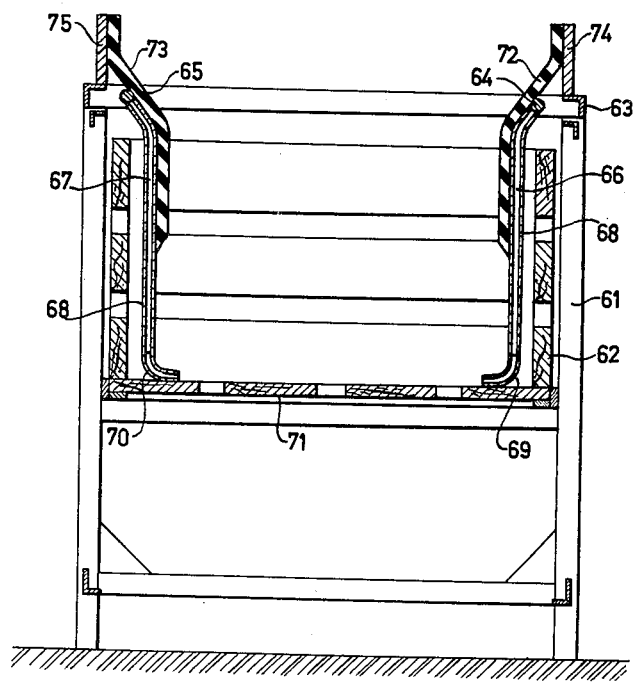
FIGURE 5 shows in outline a cross section of a modified embodiment of the device according to FIGURE 1.

In FIGURE 5 a modified embodiment of the device according to FIGURE 1 is diagrammatically represented in cross section. A frame corresponding to the frame 1 is indicated by 61. A fruit case 62 is placed on this frame 61. The upper side of the frame 61 supports a frame 63 which is movable in a vertical direction in the same way as the frame 19 of FIGURE 1. The frame 63 supports axles 64 and 65, provided with tines 66, 67, respectively. These tines 66 and 67 are lined with a soft material such as rubber in order to prevent damage of the fruit being packed. The lining proceeds beyond the free ends of the tines 66 and 67 as a result of which there is a flexible portion 69 and 70 respectively on those ends. The length of the tines 66 and 67 is such that the lower end of same in the vertical position (which position is represented in FIGURE 6) abuts the bottom 71 of the case 62 and the flexible portions 69 and 70 will be bent as they touch the bottom. This prevents small fruit from getting behind the tines.

Furthermore the tines 66 and 67 in this embodiment are covered at their upper side by pads 72 and 73 made of strips of soft material such as foam rubber or felt. As a consequence there is increased assurance that fruit delivered from the tines 66 and 67 is not damaged. The pads 72 and 73 are secured to strips 74 and 75 of the support 63 and cover the tines 66 and 67 to such an extent that the gully constituted by these tines in their upwardly turned position is covered by the pads.

What I claim is:
1. A device for filling a container with articles susceptible of damage by impact comprising a frame, two axles parallel and horizontally arranged and rotatably supported by said frame, a plurality of pronged elements attached to said axles and arranged to support said articles, readjusting means attached to said axles resisting rotation of said axles in proportion to the weight of articles in contact with said pronged elements such that the articles are deposited in said container with the latter positioned beneath said pronged elements, said pronged elements attaining a vertical position upon filling of said container with said articles, and means for effecting a relative vertical displacement between said container said said device whereby said container can be removed from said device.

2. A device for filling a container with articles susceptible of damage by impact comprising a frame, a bearing element guided on the frame for vertical movement, two axles parallel and horizontally arranged and rotatably supported by said bearing element, said axles each having two ends, one end of each axle protruding through said bearing element, a plurality of pronged elements attached to each of said axles and arranged to support said articles, two cranks, each of said cranks being connected rigidly to a respective one of said axle ends, a guide rail resiliently attached to said frame and actuated to move vertically by said cranks, said guide rail being adapted to permit said cranks to rotate until said pronged elements attain a vertical position whereupon said guide rails return to their original position, actuation means for displacing said bearing element vertically, and a spring operatively associated with said axles urging said axles to return to their original position.

3. A device as claimed in claim 2 comprising soft material covering each of said pronged elements.

4. A device as claimed in claim 3 wherein said pronged elements have two ends, one of said ends being connected to said axle and said other end unsupported, said soft material extending beyond the unsupported ends of said pronged elements.

5. A device as claimed in claim 3 wherein said pronged elements have a shape constituting a gully with said axle at rest and unloaded.

6. A device as claimed in claim 5 comprising a foot operated lever, and a rod connecting said bearing element and lever thereby transmitting a vertical movement of said lever to said bearing element.

References Cited in the file of this patent
UNITED STATES PATENTS

| | | |
|---|---|---|
| 2,277,688 | Cattonar | Mar. 31, 1942 |
| 2,668,651 | Jansen | Feb. 9, 1954 |
| 2,821,828 | Kernen | Feb. 4, 1958 |
| 2,934,871 | Watts | May 3, 1960 |
| 2,956,384 | Underwood | Oct. 18, 1960 |